United States Patent [19]

Fritsch et al.

[11] Patent Number: 4,859,390

[45] Date of Patent: Aug. 22, 1989

[54] PROCESS FOR THE PRODUCTION OF POLYAMIDE MOULDINGS

[75] Inventors: Karl H. Fritsch, Bergisch Gladbach; Peter Bier, Krefeld, both of Fed. Rep. of Germany

[73] Assignee: Bayer Aktiengesellschaft, Fed. Rep. of Germany

[21] Appl. No.: 117,517

[22] Filed: Nov. 4, 1987

Related U.S. Application Data

[63] Continuation of Ser. No. 765,457, Aug. 14, 1985, abandoned.

[30] Foreign Application Priority Data

Aug. 25, 1984 [DE] Fed. Rep. of Germany ....... 3431271

[51] Int. Cl.⁴ .......................... B29C 47/88; B29B 9/06
[52] U.S. Cl. ................................ 264/143; 264/178 F; 264/210.7; 264/210.8; 264/211; 264/211.18; 264/211.23; 264/328.17; 264/331.19
[58] Field of Search ................................ 264/141–143, 264/101, 102, 178 R, 178 F, 328.14–328.17, 210.1, 210.7, 210.8, 211.18, 211.23, 211, DIG. 56, 331.19

[56] References Cited

U.S. PATENT DOCUMENTS

| | | | |
|---|---|---|---|
| 2,834,053 | 5/1958 | Bilanin et al. | 264/141 |
| 2,859,479 | 11/1958 | Eckhardt | 264/141 |
| 2,975,483 | 3/1961 | Cooper et al. | 264/143 |
| 3,032,821 | 5/1962 | De Booys et al. | 264/178 R |
| 3,156,750 | 11/1964 | Cuculo | 264/178 R |
| 3,522,342 | 7/1970 | Nungesser et al. | 264/210.7 |
| 3,560,421 | 2/1971 | Cox, Jr. et al. | 264/211 |
| 3,585,264 | 6/1971 | Thomas | 264/211 |
| 3,624,193 | 11/1971 | Sze | 264/101 |
| 4,362,682 | 12/1982 | Berg et al. | 264/143 |
| 4,581,191 | 4/1986 | Hartmann | 264/143 |

FOREIGN PATENT DOCUMENTS

| | | | |
|---|---|---|---|
| 48-18103 | 6/1973 | Japan | 264/141 |
| 50-10906 | 4/1975 | Japan | 264/141 |
| 2096047A | 10/1982 | United Kingdom | 264/143 |

*Primary Examiner*—Jeffery Thurlow
*Attorney, Agent, or Firm*—Connolly and Hutz

[57] ABSTRACT

A process for the production of polyamide mouldings, characterized in that a polyamide melt is extruded through nozzles to form strands, which at a temperature of from 25° C. below to the respective polyamide softing point in a ratio of from 1:1.5 to 1:8 are stretched and granulated, and the granulate is worked-up in a known manner to produce injection mouldings.

5 Claims, No Drawings

PROCESS FOR THE PRODUCTION OF POLYAMIDE MOULDINGS

This is a continuation of copending application Ser. No. 765,457, filed 8/14/85, now abandoned.

The present invention relates to process for the production of polyamide mouldings with very good mechanical values, in which extruded polyamide strands are stretched longitudinally, granulated and mouldings are produced from the granulate by injection moulding.

It is known to use polyamides in many areas owing to their excellent physical properties, for example as fibres, films or injection moulded parts. Of these, injection mouldings in particular do not have sufficient strength values, therefore, it is an aim of the present invention to provide a process in which moulded parts with a relatively high mechanical level, particularly relatively high strength properties can successfully be produced without substantial variation of the injection moulding process. The process should thereby be technically simple and inexpensive.

The invention provides a process for the production of polyamide mouldings with increased strength, polyamide melts are extruded through nozzles to produce strands, which at a temperature in a range of from 25° C. below the softening point of the said polyamide up to the respective polyamide's softening point, preferably from 80° C. to 20° C. below the given softening point, in a ratio of from 1:1.5 to 1:8, preferably (1:5, are stretched longitudinally and granulated, and the granulate is worked-up in known manner to produce injection mouldings.

All thermoplastic polyamides, preferably partially-crystalline polyamides are suitable as polyamides. Thus polyamide-6, polyamide-6,6 and copolymers of these two components can be used as polyamides for the process according to the invention. Furthermore, polyamides can be used, the acid component of which completely or partially comprises terephthalic acid and/or isophthalic acid and/or suberic acid and/or sebacic acid and/or azelaic acid and/or adipic acid and/or cyclohexane dicarboxylic acid, the diamine component of which completely or partially comprises m- and/or p-xylylene diamine and/or hexamethylene diamine and/or 2,2,4-trimethylhexamethylene diamine and/or 2,4,4-trimethylhexamethylene diamine and/or isophorone diamine and/or diaminocyclohexylalkanes and the composition thereof which is known from the prior art.

Furthermore, polyamides are also used which were completely or partially produced from lactams having from 7 to 12 carbon atoms, optionally with the simultaneous use of one or several of the aforementioned starting components.

Particularly preferred polyamides are polyamide-6 and polyamide-6,6.

The polyamides should preferably have a relative viscosity (measured on a 1% by weight solution in m-cresol at 25° C.) of from 2.0 to 5.0, particularly preferably from 2.5 to 4.5.

All substances known to those skilled in the art can be used as nucleating agents, release agents, lubricants and mould released agents, as described, for example in Vieweg/Müller "Polyamide", Carl-Hanser-Verlag, pages 244–245. Particularly suitable nucleating agents are microtalcum and fine-grained polyamide powder which melts higher than the polyamide to be worked-up.

Furthermore, the polyamides can contain additional usual additives such as stabilizers, softening agents, fillings and reinforcing materials as well as dyes. The polyamide preferably contains nucleating and mould release agents.

Apparatus are used as stretching apparatus, as described, for example, in Vieweg/Müller, "Polyamide", Carl-Hanser-Verlag P. 336–343. The present invention is thereby to include slight modifications in the roller- or debiteuse stretching process. Spinning pumps (for example gear pumps after VK-Rohr) or mixing extruders (mono-shaft or twin-shaft machines) are preferably used for the production of the polyamide strands. The polyamide is thereby extruded through nozzles of from 1 to 8 mm.

The stretched strand is granulated with conventional granulators to a small granulate with an average length of 1 mm. The injection can take place, for example, on standard injection moulding machines, as used for polyamide. The temperatures should thereby not exceed 280° C., preferably 260° C., but should lie above the softening point of the polyamide to be worked-up.

EXAMPLE

Polyamide-6 with a relative viscosity of 3.15 measured on a 1% solution in m-cresol at 25° C. in a Ubbelohe viscosimeter, is melted in a twin shaft extruder of the type ZSK 30 by the firm Werner & Pfleiderer and extruded through a 4 mm circular nozzle. The product temperature is 275° C. The melt strand is cooled in a water bath and stretched in a stretching apparatus according to the roller stretching process. The stretching apparatus consists of three chrome pairs of rollers positioned perpendicularly to each other with a roller diameter of 25 cm. The pairs of rollers can be driven separately. The strand is passed through two heating zones, lying between the pairs of rollers. The temperature of the heating zones can be adjusted to from 25° C. to 300° C. In the present case, the peripheral speed between the first pair of rollers and the second is selected such that a stretching ratio of 1:3.5 is obtained. The temperature of the heating zones is 100° to 147° C. The third pair of rollers is used exclusively for transporting the strand. The strand is granulated with a granulator and the granulate is moulded into test samples at 250° C. on injection machine. The resistance to breaking and the elongation at break measured thereon (DIN 53 455) is compared in Table 1 with that of the unstretched starting sample for a polyamide with and without nucleating and mould release agents.

TABLE 1

| Example | Product | Stretching Conditions | | Resistance to breaking | Elongation at break |
| | | Temperature (°C.) | Stretching ratio | DIN (MPA) | DIN (%) |
| --- | --- | --- | --- | --- | --- |
| 1 | polyamide-6 | 147 | 1:3.5 | 66.3 | 269 |
| 2 | polyamide-6* | 100 | 1:3.6 | 67.5 | 248 |
| 3 | polyamide-6 | — | — | 56.1 | 223 |

TABLE 1-continued

| Example | Product | Stretching Conditions | | Resistance to breaking | Elongation at break |
| --- | --- | --- | --- | --- | --- |
| | | Temperature (°C.) | Stretching ratio | DIN (MPA) | DIN (%) |
| 4 | polyamide-6* | — | — | 57.5 | 176 |

*additionally contains 0.05% by weight of microtalcum and 0.5% weight of amide wax

We claim:

1. A process for the production of improved polyamide mouldings, wherein the polyamide of a relative viscosity of from 2.0 to 5.0 measured as a 1% by weight solution in m-cresol at 25° C., is first melt extruded through nozzles of 1–8 mm to form solid strands, which at a temperature of from 25° C. below the respective polyamide softening point are stretched longitudinally in a ratio of from 1:1.5 to 1:8, the strand being passed on stretching through two heating zones with temperatures adjusted from 25° C. to 300° C., the heating zones lying between stretching roller pairs, the strands then being granulated, and the granulates are then injection moulded at temperatures not exceeding 280° C. to product polyamide having improved resistance to breaking and higher elongation at break.

2. A process as claimed in claim 1 wherin the stretching ratio is <1:5.

3. A process as claimed in claim 1, wherein said stretching is carried out at a temperature of from 20° C. to 80° C. below the softening point of the polyamide.

4. A process as claimed in claim 1 wherein the polyamide contains nucleating and release agents.

5. A process as claimed in claim 4 wherein the polyamide contains microtalcum or fine grained polyamide and/or amide wax.

* * * * *